United States Patent Office 3,188,379
Patented June 8, 1965

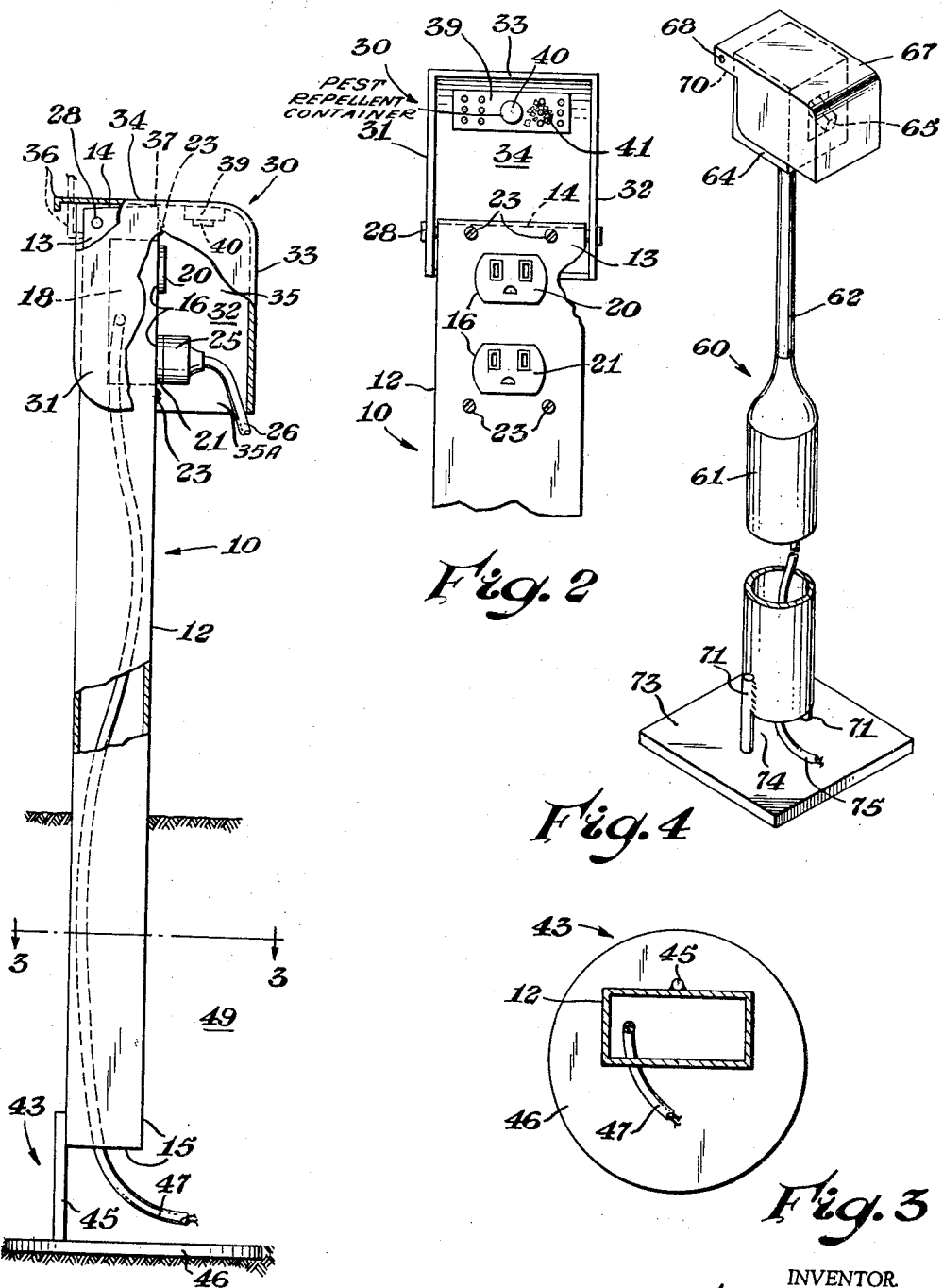

3,188,379
WEATHERPROOF ELECTRICAL INSTALLATION
WITH PIVOTALLY ATTACHED HOOD MEANS
Peter Simon, 1255 W. Chippawa River Road, Rte. 5,
Midland, Mich.
Filed Mar. 18, 1963, Ser. No. 265,969
14 Claims. (Cl. 174—38)

This invention relates to a weatherproof electrical installation and more particularly relates to a weatherproof electrical installation which does not require the use of weatherproof fittings.

The installation of weatherproof electrical devices, and the like, has provided a number of difficult problems. Typical of such problems is the installation of a power receptacle which is required to be weatherproof. Weatherproofing is generally accomplished by providing the receptacle with suitable gasketing and covers. This provides a weatherproof installation when the receptacle or outlet is not in use, however, by utilizing special plugs such as weatherproof connection may be obtained. Such weatherproof fittings tend to be relatively complex and in many cases the cost is prohibitive. Oftentimes it is desirable to utilize convenient, readily available, non-weatherproof fixtures, such as, the conventional 2 or 3 prong or blade 110 volt plug caps, non-weatherproof switches and the like devices and to have the installation weatherproof at all times. With conventional weatherproof outlets this is generally not achieved, for example; a conventional weatherproof convenience outlet, used with the commonly available non-weatherproof plug caps, a path exists for the entry of water, snow and the like into the fixture. The known weatherproof devices and connections generally are readily damaged and rendered non-weatherproof by the presence of dirt and foreign bodies because of their requirement of mechanical precision and fit of sealing surfaces. Often it is desirable to install electrical devices such as convenience outlets, switches, key operated switches, door openers, lights, circuit breakers, and the like, at a location remote from buildings, wherein they are supported directly in the earth or a thin pavement. It usually is economically advantageous, for remote installations of this nature, to utilize direct burial trench cable. By the term "direct burial trench cable" is meant a cable which is found satisfactory for direct burial in a trench without the additional protection of a conduit or other protective means. Generally it is beneficial from an economic standpoint to install lines or cable in a trench at a depth that is substantially less than the depth at which the ground will freeze during the winter. Freezing of the earth occasionally results in a cable being pulled away from or broken at its entrance to a fixture containing such devices as, outlets, switches, lights and the like. Damage usually results from frost heaving wherein the post and the cables are mechanically dispaced reative to one another.

It is an object of this invention to provide a weatherproof electrical fixture which may be supported by burying the foot of its support to a relatively shallow depth.

A further object of the invention is to provide an improved weatherproof electrical installation which permits ready access to the desirably exposed portion thereof.

Another object of the invention is to provide a weatherproof electrical installation utilizing non-weatherproof electrical fittings.

A still further object of this invention is to provide a weatherproof device such as a convenience outlet which may be supported on a column partially buried in the earth and secure against frost heaving and utilizing non-weatherproof electrical components.

These objects and other benefits and other advantages of the invention are achieved by providing an electrical fixture including a pivotally attached hood which protects the fixture from the weather. The hood is so constructed and arranged that when the fixture is positioned in its desired operating position that the force of gravity tends to maintain the hood over the device to be protected, the fixture having a hollow supporting member having at least one leg member extending outwardly and away from the body of the fixture and terminating in a broad plate-like foot member having an area substantially greater than the cross sectional configuration of the body in a plane generally parallel with said foot.

Further features and advantages of the present invention will become more apparent when the following specification is taken in conjunction with the drawing wherein:

FIGURE 1, is a partly-in-section schematic view of an electrical fixture;

FIGURE 2, is a view of a portion of the fixture of FIGURE 1;

FIGURE 3, is a sectional view of a portion of the fixture of FIGURE 1 taken along the line 3—3; and FIGURE 4, is a schematic representation of an alternate embodiment of the invention.

In FIGURE 1 there is schematically illustrated, by means of a partially-in-section view, an electrical installation or fixture generally designated by the reference numeral 10. The installation 10 comprises an elongated body or conduit 12, having a closed end 13 and open end 15. The end 13 is closed by the surface 14. Access means or openings 16 are located generally adjacent the end 13 and are positioned in a surface which is generally paralleled to the axis of the conduit 12. An electrical device generally indicated by numeral 18, is positioned within the conduit 12 and the desirably exposed portions 20 and 21 protrude through openings 16. The device 18 is secured to the conduit 12 by means of the screws 23. A plug cap, 25, in operative combination with a cable 26, is in engagement with the protruding portion 21 of the device 18. A pivot means 28 is supported at closed end 13 of conduit 12 in a position generally remote from the exposed portion of the device 18. A hood generally designated by reference numeral 30 is pivotally supported by the pivot 28. The hood 30, comprises a side 31, a side 32, a front 33, and a top portion 34 the hood 30 in cooperation with the conduit 12 adjacent the access means 16, defines a space 35 and a downwardly facing opening 35A, remotely disposed from the pivot means 28. The space 35 being of sufficient size to contain the plug cap 25 and permit the cable 26 to depend from the opening 35A. Portions of the sides 31 and 32 remote from the front of the hood 30 being in immediately adjacent overlapping relationship to the sides of the body or conduit 12. A stop 36 is rigidly affixed to a top 34 in such a manner that it limits the pivotal travel of the hood 30. Dotted lines adjacent 36 and the pivot 28 illustrate the position of stop 36 at its maximum travel. The top surface 34 engages a portion of the end 13 of the conduit 12 at the location 37 which limits the pivotal travel of the hood 30 in the opposite direction. Disposed within the hood 30 and affixed to the inner surface of the top 34 is a perforated compartment or enclosure 39. The compartment 39 is provided with a closure or plug 40.

The open end 15 of the conduit 12 is provided with a foot member generally designated by the reference numeral 43. The foot member 43, comprises, a leg 45, secured to the wall of the conduit 12 and a plate or shoe 46, which is secured to the end of leg 45, remote from the conduit 12. A direct burial trench cable 47, passes adjacent the body 46 into the conduit 12, through the open end 15 and is secured to the device or receptacle 18. The lower portion of the installation 10 is surrounded by the earth 49.

In FIGURE 2, there is illustrated a front view of the upper portion of fixture 10, wherein the plug cap 25, and cable 26, are removed and the hood 30 is in its uppermost position. Disposed within the compartment 39, is a quantity of a pest repellent material 41.

In FIGURE 3, there is shown the relationship of the conduit 12, the leg 45, and the foot 46, in a sectional view taken of the fixture 10, along line 3—3 in the direction of the arrows.

In FIGURE 4, there is schematically represented an isometric view of an alternate fixture in accordance with the invention generally designated by the reference numeral 60. The fixture 60 comprises a conduit 61 having affixed thereto, and in coaxial relationship therewith, a conduit 62 of lesser diameter terminating in an enclosure 64. The enclosure 64 contains a switch 65, a hood 67, is pivotally secured to the enclosure 64 by means of the pivot 68, a top surface of hood 67 extends beyond the pivot 68 to form a stop 70, which is disposed substantially in the same manner as hood 30, and the stop 36, of FIGURES 1 and 2. Secured to conduit 61, remote from conduit 62 are a pair of leg members 71. The leg members 71 are affixed to a foot or plate 73 in such a manner as to provide a space 74 between the terminal portion of conduit 61 and the plate 73. A cable or line 75, passes into the space 74, through the conduits 61 and 62, and is secured to the switch 65 in enclosure 64.

Fixtures in accordance with the present invention are readily prepared from conventional construction materials such as: metals, plastics and the like, generally it is oftentimes convenient to utilize commonly available material shapes such as, cylindrical or rectangular conduit, of, aluminum or steel In cases where highly corrosive conditions exist, phenolic resin-fiber pipe and sheet, polyester glass-fiber may be used for the body, hood and foot in which the electrical device is installed.

Particularly critical is the configuration of the hood such as the hood 30, of FIGURE 1, and the hood 67 of the FIGURE 4. In order to provide the maximum utility and protection for the electrical device the hood extends on 3 sides along the body and away from the pivot for a distance sufficient to cover the electrical device and to protect it from rain and snow. The body or housing containing the electrical device is provided with a pivot positioned remote from the access opening and carrying the hood. The top or surface of the hood generally maintained adjacent the body or enclosure by the pivot is engaged by the top surface of the hood in the protective position, thus, limiting the travel of the hood toward the protected electrical device. Travel of the hood in the opposite direction is limited by the stop such as 36 and 70 when they encounter the body of the enclosure. When the enclosure is mounted in the desired position, the hood is prevented from being moved into a position where its center of gravity is so located that the hood, unsupported falls into a position covering the electrical device. The hood closely conforms, to at least the dimension of the enclosure, in the direction of the pivot axis to permit it to pivot freely and provide excellent weather protection for the electrical device.

The weather protection becomes readily apparent by reference to FIGURE 1. Rain or snow striking the hood at an angle cannot find its way to the exposed surface of the protected electrical device. Rain approaching in the general direction of the front surface 33 is totally deflected. Rain approaching from the side of the body 10, remote from the access openings 16 may usually travel only a short distance in the narrow space between the hood 30 and the body 12. If rain or snow were to impinge upon the device from the side of the body 12, which engages the stop 36, in a direction parallel to the side of the hood 31, a small amount of rain might enter the inner portion of the enclosure but would impinge only on the inner surface of the hood and would not contact the device positioned therein. By utilizing a dependent stop, such as, 36 and 70 which extends the entire width of the hood no tendency is observed for rain or snow to pass beneath the top surface such as surfaces 34 and 67. Advantageously the uppermost terminal position of the body or enclosure (such as surface 14 of FIGURE 1) is sloped away from the face carrying the electrical device thereby providing drainage for condensation and the like. Therefore substantially complete protection from rain or snow and the electrical device is assured.

Arrangement of the hood in accordance with the invention provides the added benefit of affording protection to the exposed device even when the hood is not in the lowest position which gravity alone would afford. For example, if the cable 26, of FIGURE 1, were larger and less flexible it would tend to hold the hood 30 outwardly from the body 12. As can be readily seen from FIGURE 1, angular displacement of the hood 30 by a cable stiffer than cable of 36 would still afford protection for the electrical device.

Oftentimes such electrical devices are installed in locations where such pests as wasps, hornets and other bugs would utilize such hoods as a nesting place. The perforate chamber 39 provides a convenient receptacle for the inclusion of pest repelients typically such as crystalline paradichlorobenzene, which is most effective in discouraging these creatures. The closure 40 provides a ready access to the perforate enclosure 39 and allows the addition of quantities of pest repellent as required.

Oftentimes fixtures carrying convenience outlets, switches and the like are installed direct in the earth. The present invention provides a means for supporting such a device readily, safely and conveniently when utilized in conjunction with direct burial cables such as 47 and 75 of FIGURE 1 and FIGURE 4.

The foot arrangement of the devices 10 and 60 are particularly convenient and advantageous when used in a climate where significant freezing of the soil occurs. The cable is inserted through the lower opening of the body and is disposed within the body in a generally serpentine manner. The opening generally adjacent the foot is of sufficient size to permit free movement of the cable therein. The broad foot affixed to the body by means of a leg permits the entire installation to rise and fall with the frost heaving and does not exert a severe strain on the cable that occurs when a plurality of outwardly disposed dependent feet are used.

The relatively broad foot is also beneficial and advantageous on installation of the device in relatively soft or wet ground. The tendency of the installation to shift prior to back filling is significantly and substantially reduced when compared with known base pieces. Oftentimes during such an installation a workman may sit on or press with his foot on the top of the device. The broad foot of the present invention will usually prevent sufficient movement of the device in the ground to damage the cable.

A considerable economic advantage is also achieved by means of the simplicity and ruggedness of the design, furthermore it readily lends itself to field fabrication by a variety of means although the illustrations depict primarily welded connections, such joints and connections are readily accomplished by field welding or shop welding, bolting, riveting and brazing may be used if desired.

Particularly advantageous is the embodiment of FIGURE 4, wherein the body or column is made of generally cylindrical conduit and having a foot member with one or more legs rigidly securing the foot member in spaced relationship to the conduit and in a plane generally perpendicular to the axis of the conduit. Secured to the portion of the conduit most remote from a foot or plate 73 is the enclosure 64. Such an enclosure or housing conveniently may be a rectangular box having a female threaded boss to engage a male threaded portion of the conduit. The pivot 68 and hood 67 are conveniently added to the box. The pivot 68 may be a long machine screw. The only non-stock item utilized in the assembly is the hood 67. The foot plate is readily available in the form of steel plate and the leg portions 71 can be rod, bar, pipe, or electrical metallic conduit.

A particularly advantageous and beneficial feature of the present invention is the relative stability of the fixtures in accordance with the invention, in rapidly moving air. Many weatherproof enclosures tend to rattle and create undesirable noise. Weatherproof electrical devices in accordance with the present invention are found to be relatively silent in the wind. Even at relatively high wind velocity there is little or no tendency observed for electrical installation in accordance with the present inventions to create undesired noise.

As is apparent from the foregoing specification, the present invention is capable of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:

1. An electrical fixture comprising a hollow body having a first end and a second end, said first end of the body being closed, and said second end defining an opening, said body defining an access means disposed between said first end and said second end, and adjacent said first end, an electrical device positioned within said hollow body member with the desirably exposed portion of said electrical device being generally adjacent said access means, a pivot means disposed at said first end of said body remote from said access means, a hood adapted to protect said access means from weather such as rain and snow, said hood freely pivotally attached to said pivot means, a stop means affixed to said hood adjacent said pivot and so constructed and arranged so as to limit the travel of hood so that the force of gravity tends to cause the hood to cover the access means the first end of the body and portions of the body adjacent the access means sufficient to provide weather protection to the access means when the hood is displaced a minor extent from the extreme downward position, the hood being maintained in position by gravity, the hood having a top, a front and two sides, the front being disposed in adjacent spaced relationship to the access means when in the protective position and portions of the sides remote from the front of the hood being in immediately adjacent overlapping relationship to the sides of the body, the hood and body adjacent the access means defining a space having a downwardly facing opening remotely disposed from the pivot means at least one leg member disposed at the second end of said body, said leg member extending outwardly and away from the second end of said body and terminating in a broad plate-like foot member, having an area substantially greater than the cross sectional configuration of the body at said second end in a plane generally parallel with said foot.

2. The fixture of claim 1 wherein said body defines an internal passageway from the opening of said second end to said electrical device wherein a cable may be positioned in a serpentine manner.

3. The fixture of claim 1 wherein the body portion comprises a generally rectangular elongated conduit adapted to be disposed generally vertically, said hood comprises a top surface having a dependent flange forming an enclosure adapted to enclose at least three sides of the rectangular conduit, the hood disposed about the exposed portion of an electrical device, said flange of said hood being spaced from said exposed portion of said electrical device.

4. The fixture of claim 1 wherein said hood is provided with an internally disposed porous container adapted to receive a volatile substance.

5. The fixture of claim 4 wherein said porous chamber is a perforated chamber and has an access closure for the filling of said chamber.

6. An electrical fixture adapted to contain an electrical device and allow access to the desirably exposed portion of said device, said fixture comprising a hollow body having means to support an electrical device, an entrance means for at least one electrical cable and a means to support a housing, a pivot affixed to said housing, a hood freely pivotally attached to said housing, said hood so constructed and arranged that when said housing is oriented with the electrical device in the desired position the hood protects the device and the uppermost portion of the hollow body together with a major portion of the hollow body adjacent the electrical device from falling rain and snow and said hood when pivoted on said pivot for access to said device will return to a protective position when the hood is no longer manually supported by external means, the hood having a top, a front and two sides, the front being disposed in adjacent spaced relationship to the access means when in the protective position and portions of the sides being in immediately adjacent overlapping relationship to the sides of the body, the hood and body adjacent the access means defining a space having a downwardly facing opening remotely disposed from the pivot means.

7. The fixture of claim 6 wherein said hood is provided with an internally disposed porous container adapted to receive a volatile substance.

8. The fixture of claim 7 wherein said porous chamber is a perforated chamber and has an access closure for the filling of said chamber.

9. The electrical fixture of claim 6 wherein said electrical device is a switch.

10. The electrical fixture of claim 6 wherein said electrical device is a receptacle for plug cap.

11. The electrical fixture of claim 6 wherein said hood is provided with a stop to prevent the hood from pivoting to a position where it will not return to its protective position about said electrical device, said stop extendng from the surface of said hood generally adjacent to said pivot and lying in a plane generally parallel to said pivot.

12. The electrical fixture of claim 11 wherein said stop is formed from a dependent flange disposed in angular relationship to said hood surface generally parallel to the axis of said pivot and the terminal portion of said flange is adapted to engage said hollow body.

13. An electrical fixture comprising a body having a closed upper end and an open end, the body defining access means disposed generally normal to a plane containing the closed upper end, a pivot disposed at the closed upper end and remotely from the access means, a hood freely pivotally supported by the pivot, the hood enclosing at least three sides and the upper end portion of the body defining the access means, the hood having a top, a front and two sides, the front being disposed in adjacent spaced relationship to the access means when in the protective position and the sides being immediately adjacent to the body, the hood and body adjacent the access means defining a space having a downwardly facing opening remotely disposed from the pivot means a stop means affixed to the hood adjacent the pivot and so constructed and arranged so as to limit the travel of the hood so that the force of gravity causes the hood to cover the access means and be maintained in spaced relationship thereto when supported only by the pivot.

14. The fixture of claim 13 wherein the closed upper end of the body slopes away from the access means.

(References on following page)

References Cited by the Examiner

UNITED STATES PATENTS

| | | | |
|---|---|---|---|
| 412,498 | 10/89 | Hall | 189—29 X |
| 1,760,598 | 5/30 | Horn | 239—57 |
| 1,798,494 | 3/31 | Post | 174—37 |
| 1,891,253 | 12/32 | Wiegand et al. | 174—75 |
| 2,330,975 | 10/43 | Jackson | 220—3.8 |
| 2,420,103 | 5/47 | Smith | 339—44 X |
| 2,501,762 | 3/50 | Davis | 220—18 |
| 2,586,761 | 2/52 | Eskola | 239—60 X |
| 2,656,948 | 10/53 | McGee | 220—3.8 X |
| 2,841,634 | 7/58 | Kimball | 174—45 |

FOREIGN PATENTS

| | | |
|---|---|---|
| 584,631 | 9/63 | Germany. |
| 621,240 | 4/49 | Great Britain. |
| 716,778 | 10/54 | Great Britain. |

JOHN F. BURNS, *Primary Examiner.*

JOHN P. WILDMAN, E. JAMES SAX, LARAMIE E. ASKIN, *Examiners.*